United States Patent [19]
Trott et al.

[11] Patent Number: 5,862,283
[45] Date of Patent: Jan. 19, 1999

[54] MOUNTING A PLANAR OPTICAL COMPONENT ON A MOUNTING MEMBER

[75] Inventors: Gary R. Trott, San Mateo; Kent W. Carey, Palo Alto; Long Yang, Union City, all of Calif.

[73] Assignee: Hewlett-Packard Company, Palo Alto, Calif.

[21] Appl. No.: 705,870

[22] Filed: Aug. 28, 1996

[51] Int. Cl.⁶ ........................................... G02B 6/36
[52] U.S. Cl. .............................................. 385/88; 385/147
[58] Field of Search .................. 385/14, 24, 51, 385/52, 88, 89, 90, 91, 136, 137, 147

[56] References Cited

U.S. PATENT DOCUMENTS

| | | | |
|---|---|---|---|
| 4,640,591 | 2/1987 | Cutburth | 350/632 |
| 4,932,745 | 6/1990 | Blonder | 350/96.2 |
| 5,124,281 | 6/1992 | Ackerman et al. | 437/209 |
| 5,181,216 | 1/1993 | Ackerman et al. | 372/36 |
| 5,257,332 | 10/1993 | Pimpinella | 385/52 X |
| 5,280,336 | 1/1994 | Fantone | 356/124 |
| 5,291,572 | 3/1994 | Blonder et al. | 385/94 |
| 5,307,434 | 4/1994 | Blonder et al. | 385/91 |
| 5,367,589 | 11/1994 | MacDonald et al. | 385/37 |
| 5,420,953 | 5/1995 | Boudreau et al. | 385/88 |
| 5,439,782 | 8/1995 | Haemmerle et al. | 430/321 |
| 5,440,655 | 8/1995 | Kaplow et al. | 385/24 X |
| 5,566,264 | 10/1996 | Kuke et al. | 385/49 |
| 5,611,006 | 3/1997 | Tabuchi | 385/14 |

FOREIGN PATENT DOCUMENTS

| | | | |
|---|---|---|---|
| 0171615 A2 | 2/1986 | European Pat. Off. | G02B 6/12 |
| 0226296 A1 | 6/1987 | European Pat. Off. | G02B 6/42 |
| 0463779 A1 | 1/1992 | European Pat. Off. | G02B 6/12 |
| 0723170A2 | 7/1996 | European Pat. Off. | G02B 6/42 |
| 2714740 A | 1/1994 | France | G02F 1/095 |
| 3227156 A | 7/1982 | Germany | G02B 5/176 |
| 4431285 C | 9/1994 | Germany | G02B 6/43 |
| 58169122 | 10/1983 | Japan | G02B 27/10 |
| 58216201 | 12/1983 | Japan | G02B 5/08 |
| WO 90/01715 | 2/1990 | WIPO | B02B 7/18 |
| WO 96/00914 | 1/1996 | WIPO | G02B 6/293 |

*Primary Examiner*—John D. Lee
*Attorney, Agent, or Firm*—Thomas X. Li

[57] ABSTRACT

A method of precisely mounting a planar optical component on a mounting member includes the step of placing a plurality of balls on the mounting member to precisely define a geometric plane. The planar optical component is then placed against each of the balls on the mounting member such that the planar optical component is along the defined geometric plane on the mounting member. In addition, the planar optical component can also be mounted on the mounting member by first forming a groove in the mounting member. An end of the planar optical component is then shaped to match that of at least one wall of the groove. The planar optical component can then be placed in the groove such that the shaped end of the planar optical component is placed against the wall of the groove.

14 Claims, 16 Drawing Sheets

MOUNTING A PLANAR OPTICAL COMPONENT ON A MOUNTING MEMBER

BACKGROUND OF THE INVENTION

1. Field of the Invention

The present invention pertains to fiber optics or photonics modules. More particularly, this invention relates to precisely erect a planar optical component (e.g., a mirror or an optical filter) on a mounting member.

2. Description of the Related Art

Optical communications systems are widely used for carrying very large amount of information with low error rate and at low cost over great distances. For this reason, considerable development has been done on components of optical communication systems, such as photonics packages or modules. Photonics generally refers to devices that share both electronic and optical attributes. These devices can be laser devices, which generate coherent light in response to an electronic signal, and photo detectors, which generate an electronic signal in response to light.

A typical photonics module such as the photonics module 10 of FIG. 1 uses edge emitting semiconductor lasers and surface detecting photo detectors. As can be seen from FIG. 1, since an edge emitting laser 11 has a relatively wide radiation angle, a lens 12 is typically inserted between the laser 11 and an optical fiber 13 to obtain high optical coupling efficiency. In addition, a lens 17 is typically inserted between the optical fiber 13 and a photo detector 15. The inserted lens 17 improves the optical coupling efficiency between the optical fiber 13 and the photo detector 15. Because the photonics module 10 can function, for example, as a bidirectional module, it may be desirable to insert an optical filter 18 in the photonics module 10 to direct light beams among the three elements 11, 13, and 15 for desired operation.

In making the photonics module 10, the laser 11, the lens 12, the optical filter 18, and the optical fiber 13 must be in precise predetermined alignment with one another. In addition, the optical fiber 13, the optical filter 18, the lens 17, and the photo detector 15 must be in precise predetermined alignment with one another. To achieve this, fixtures and/or mounts are typically needed to hold the components in place and in alignment with one another, as shown in FIG. 2.

As can be seen from FIG. 2, a fixture 21 is used to hold the lens 12 in place and in predetermined alignment with the laser 11 that is also mounted on the fixture 21. This fixture 21 is then coupled to another fixture 22 that holds the optical fiber 13 and the optical filter 18 in place. A third fixture 20 is used to hold the lens 17 in place and in alignment with the photo detector 15. The fixture 20 also mounts and secures the photo detector 15. Because the photo detector 15 is the surface detecting photo detector (as shown in FIG. 2), the photo detector 15 is mounted on the fixture 20 perpendicular to the incoming light, as shown in FIG. 2. The fixture 20 is also coupled to the fixture 22. The alignment of the laser 11, the lenses 12 and 17, the photo detector 15, the optical filter 18, and the optical fiber 13 is achieved by the fixtures 20 through 22.

One disadvantage of such photonics modules or packages is that the fixtures are typically relatively costly to fabricate because they typically require relatively high precision. Another disadvantage is that it is typically time consuming to assemble the photonics modules using the fixtures, thus causing low throughput. In addition, time may also be needed for alignment and adjustment during assembling the photonics modules. This typically hinders mass-production of the photonics modules by operators having a moderate level of skill while maintaining the required alignment criteria. These factors typically limit the cost reduction of the photonics modules.

Prior attempts have been made to mount a number of components (e.g., a laser and a spherical lens) on a single silicon mounting member. However, it is typically difficult to precisely mount a planar optical device such as the optical filter 10 of FIGS. 1–2 on a planar surface of a mounting member using conventional mounting mechanisms because it is difficult to define the three-dimensional location of the planar optical device on the planar surface of the mounting member. In addition, mounting the planar optical device on the planar surface of the mounting member requires active alignment and complex bonding and packaging steps.

SUMMARY OF THE INVENTION

The present invention is to precisely and controllably locate and erect a planar optical component on a mounting member.

The present invention is to precisely and controllably locate and erect a planar optical component on a mounting member without requiring active alignment.

The present invention allows the location and position of a planar optical component on a mounting member to be precisely defined.

A method of precisely mounting a planar optical component on a mounting member is described. The method includes the step of placing a plurality of balls on the mounting member to precisely define a geometric plane. The planar optical component is then placed against each of the balls on the mounting member such that the planar optical component is along the defined geometric plane on the mounting member.

In addition, another method of precisely mounting the planar optical component on the mounting member is described. This method includes the step of forming a groove in the mounting member. An end of the planar optical component is then shaped to match that of at least one wall of the groove. The planar optical component can then be placed in the groove such that the shaped end of the planar optical component is placed against the wall of the groove.

Other features and advantages of the present invention will become apparent from the following detailed description, taken in conjunction with the accompanying drawings, illustrating by way of example the principles of the invention.

DETAILED DESCRIPTION OF THE INVENTION

Figure 1:
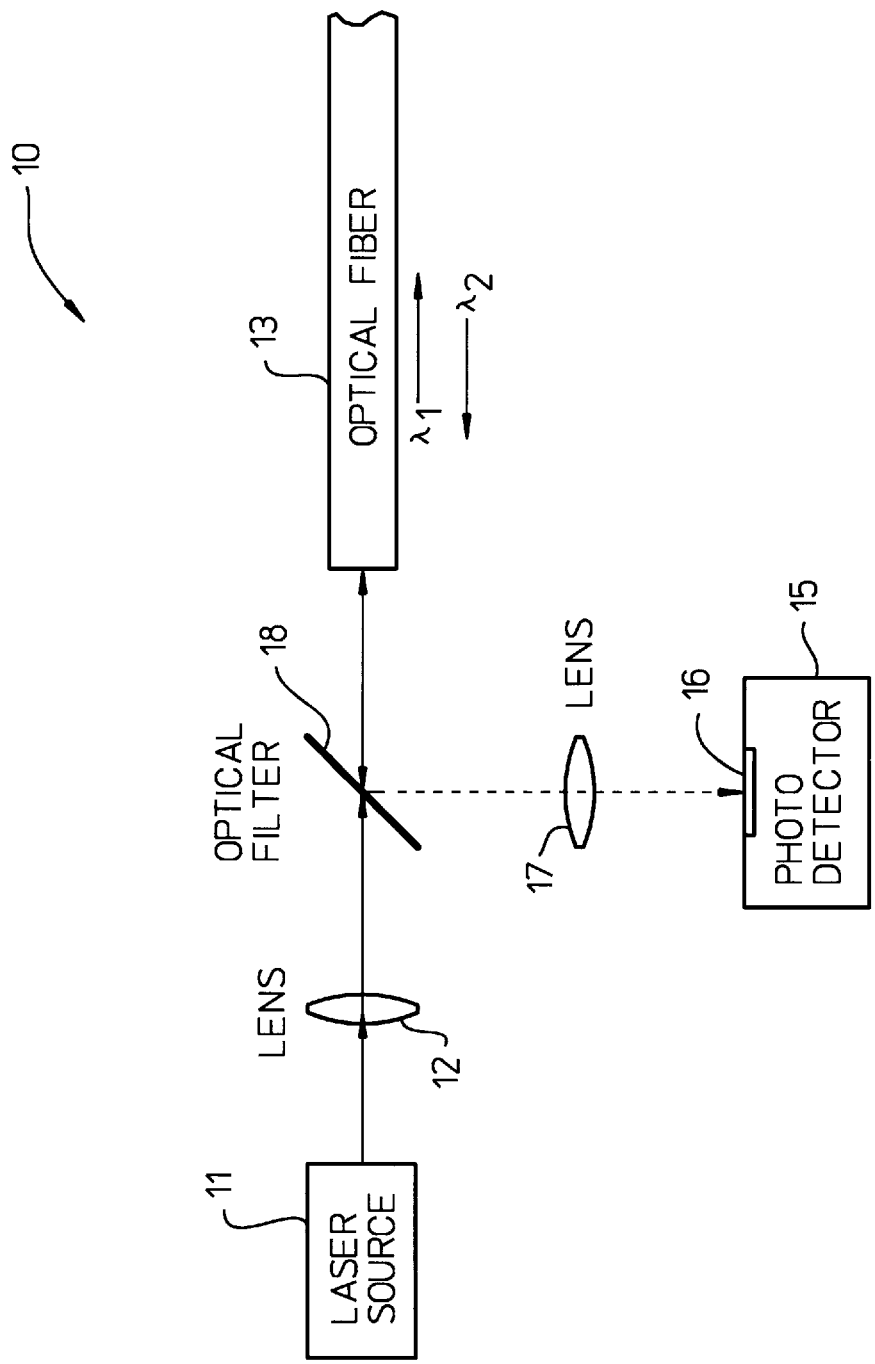
FIG. 1 schematically shows a prior art bidirectional photonics module.
Figure 2:
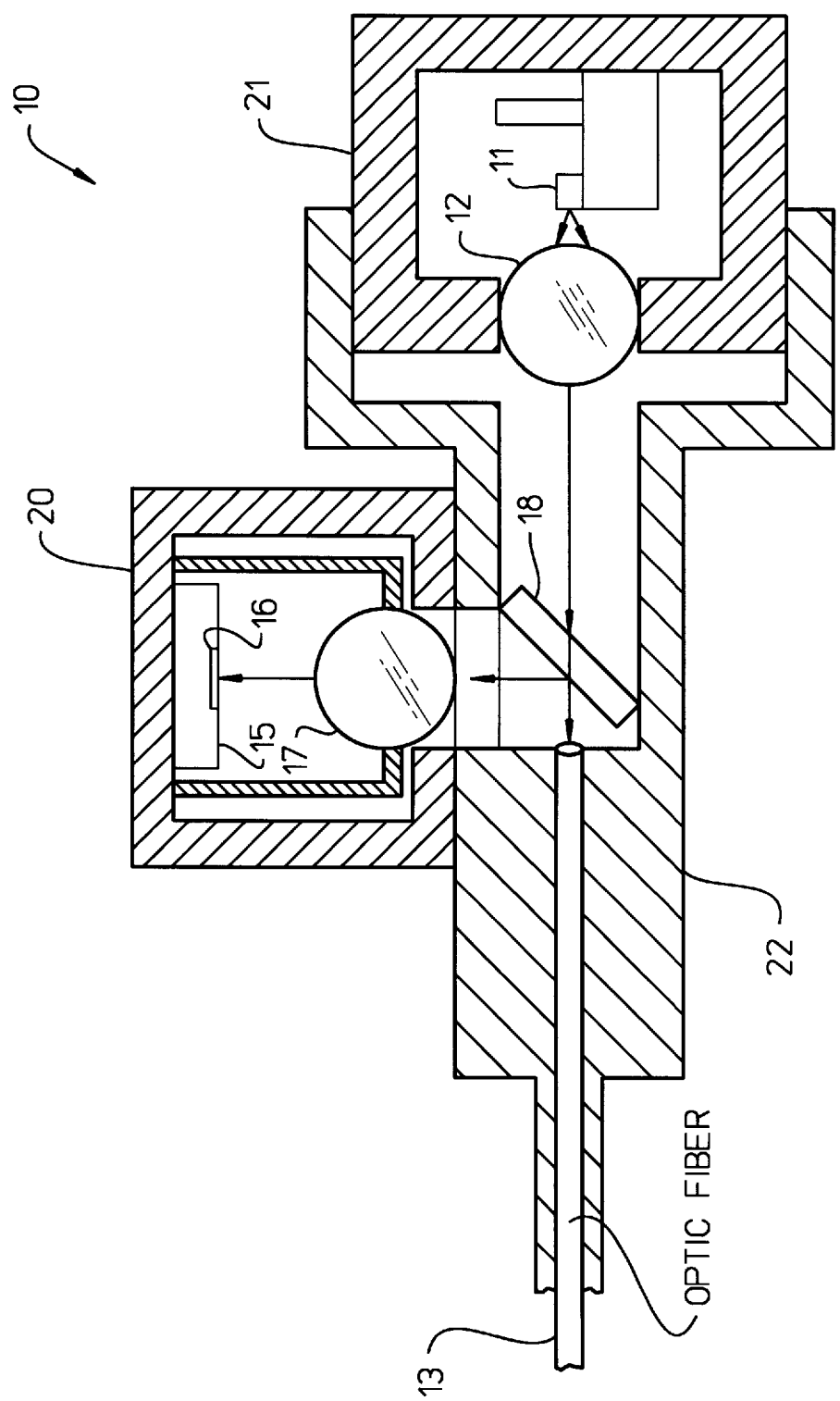
FIG. 2 is a side cross sectional view showing the package of the bidirectional photonics module of FIG. 1.
Figure 3:
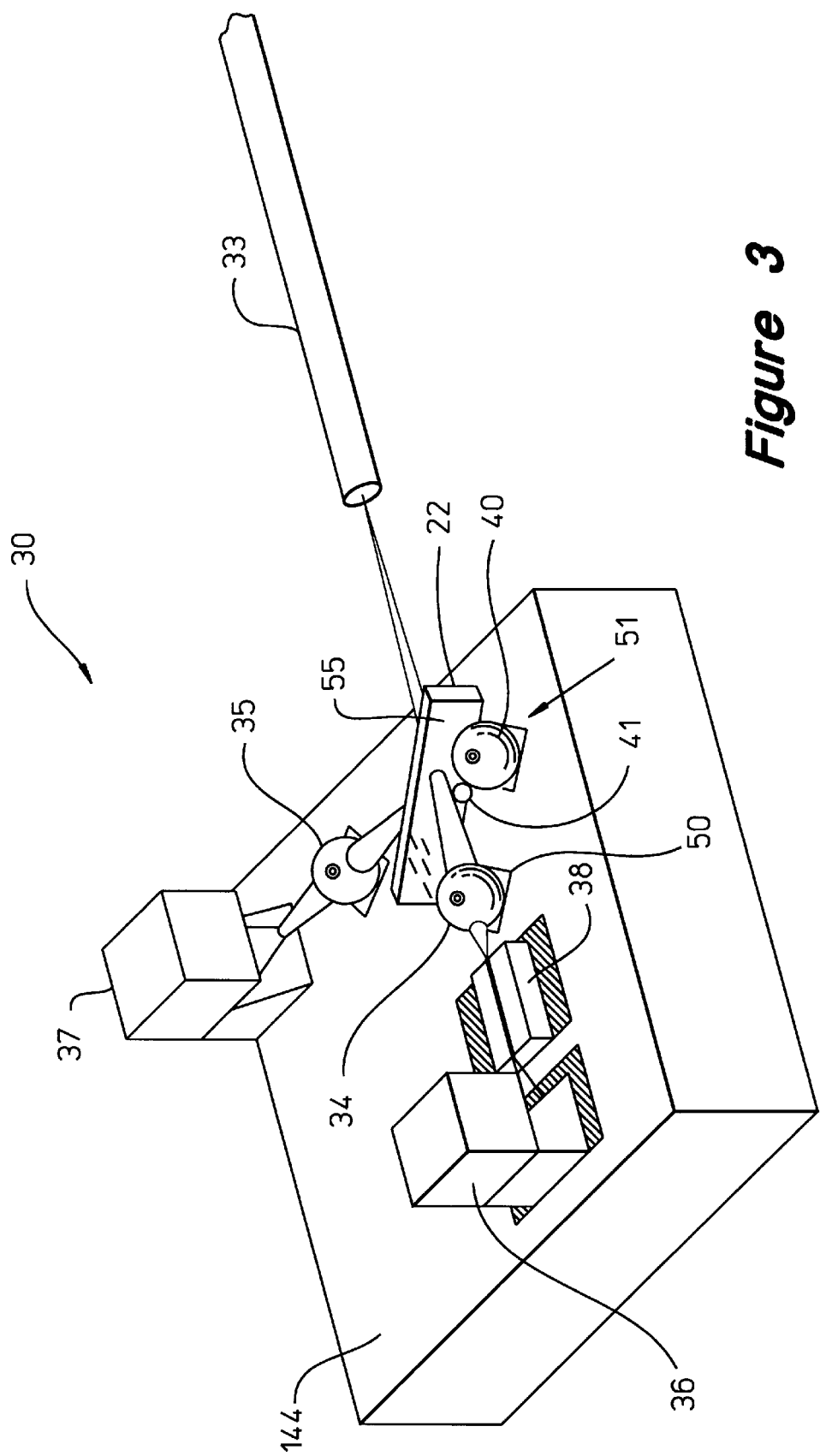
FIG. 3 is a perspective view of a bidirectional photonics module that has a planar optical device precisely mounted on a mounting member in accordance with one embodiment of the present invention.
Figure 4:
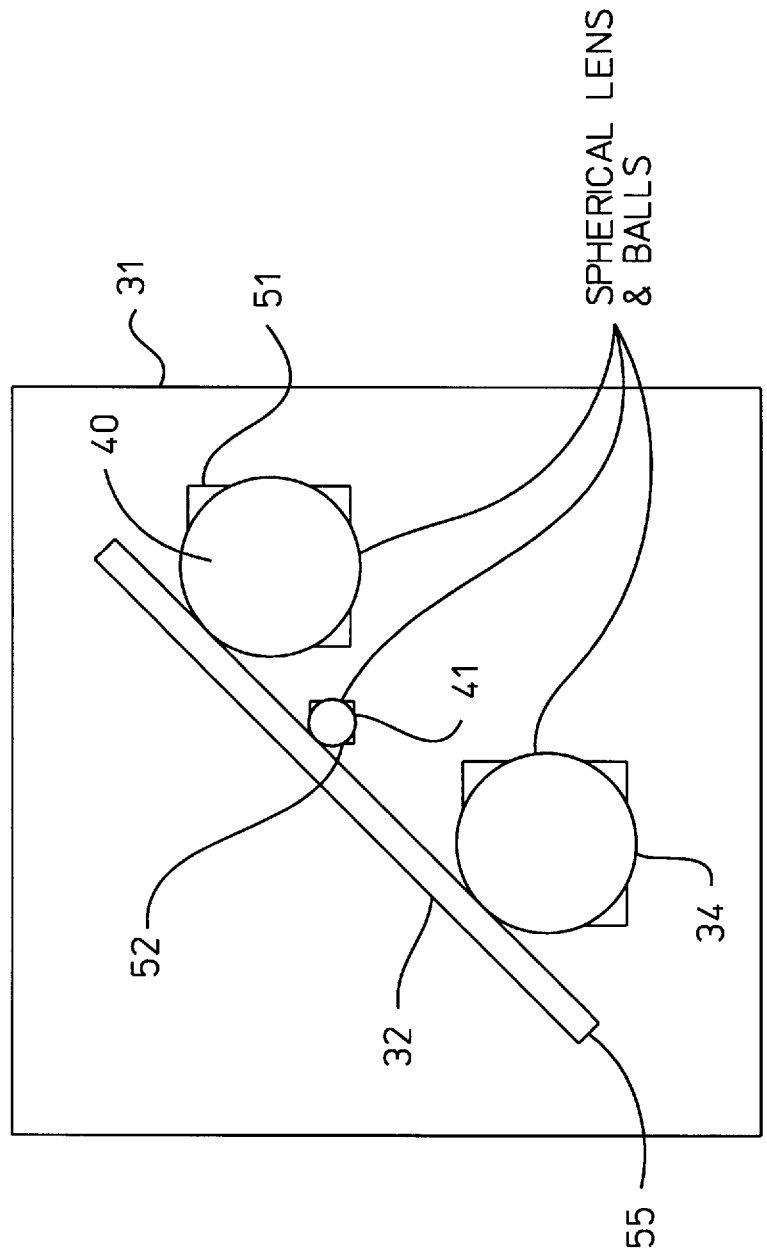
FIG. 4 is a top view of a portion of the mounting member of FIG. 3 that illustrates the mounting of the planar optical device.

FIGS. 3 and 4 show an arrangement of precisely and controllably erecting and mounting a planar optical device 32 of a photonics module 30 on a mounting member 31 in accordance with one embodiment of the present invention. FIG. 3 is a perspective view of the photonics module 30 and FIG. 4 is a top view of the photonics module 30. In accordance with the arrangement, a number of spherical positioning balls (e.g., the spherical lens 34 and the spherical balls 40 and 41) are placed on the mounting member 31 to define a geometric plane 55. Alternatively, the positioning balls are not required to be spherical. For example, each positioning ball can be elliptical. As a further example, each positioning ball can be polyhedral.

The planar optical device 32 is then placed on the mounting member 31 against each of the spherical balls such that the planar optical device 32 is placed along the defined geometric plane 55. This allows the planar optical device 32 to be precisely and controllably mounted on the mounting member 31. The arrangement shown in FIGS. 3–4 will be described in more detail below.

In FIG. 3, the planar optical device 32 is shown as an optical filter. Alternatively, the planar optical device 32 can be other type of optical device with a planar surface or edge. For example, the planar optical device 32 can be a planar mirror, an isolator, or a prism.

In one embodiment, the photonics module 30 is a bidirectional photonics module. Alternatively, the photonics module 30 may not be bidirectional. For example, the photonics module 30 may simply be a unidirectional photonics module.

As can be seen from FIGS. 3–4, the photonics module 30 includes a laser 38, a photo detector 37, a monitor 36, and spherical lenses 34–35, in addition to the planar optical device 32. In one embodiment, the spherical lenses 34–35 are ball lenses. In a further embodiment, the spherical lens 34 serves both as an optical lens and as a spherical positioning ball. An optical fiber 33 is optically coupled to the spherical lenses 34–35 via the planar optical device 32. The spherical positioning balls 40 and 41 are also provided. All of the components 34 though 38 and 40–41 are mounted on the mounting member 31. The monitor 36 is a photo detector that functions as a back facet monitor of the laser 38.

In one embodiment, the mounting member 31 is made of a crystalline silicon having <100> crystallographic surfaces. This type of silicon is referred to as <100> silicon below. Using silicon for the mounting member 31 allows the mounting member 31 to be processed by a photolithographic masking and etching process that can precisely define the position and location of each component on the mounting member 31 with tolerances of about one micron. In addition, the size of the photonics module 30 is made very small because of the integration of the components on the single mounting member 31 and a large number of the mounting member 31 can be made from a single silicon wafer using batch processing. Alternatively, the mounting member 31 can be made of other types of materials. For example, metal or ceramic materials can be used to make the mounting member 31.

The laser 38 is optically aligned with the spherical lens 34. The photo detector 37 is optically aligned with the spherical lens 35. The planar optical device 32 is required to be optically aligned with the spherical lenses 34–35. The optical alignment of the planar optical device 32 typically includes a yaw alignment, a pitch alignment, and a lateral alignment. The yaw alignment determines, for example, whether the planar optical device 32 intersects the optical axis of the laser 38 and the spherical lens 34 at an appropriate angle. In one embodiment, the appropriate angle is 45°. In alternative embodiments, the appropriate angle can be greater or less than 45°. For example, the appropriate angle can be 54.7°.

The pitch alignment determines if the planar optical device 32 intersects the top surface of the mounting member 31 at a predetermined angle (e.g., 90°). The lateral alignment determines the distance of the planar optical device 32 from the spherical lenses 34–35.

To precisely place and align the planar optical device 32 on the mounting member 31, the three-dimensional position of the planar optical device 32 on the mounting member 31 needs to be precisely defined. In accordance with one embodiment of the present invention, this is achieved by defining the geometric plane 55 in which the planar optical device 32 is to be placed. The defined geometric plane 55 is optically aligned with other components on the mounting member 31. When the planar optical device 32 is placed in the defined geometric plane 55 on the mounting member 31, the planar optical device 32 is precisely mounted and aligned.

As described above, the positioning lens and balls 34 and 40–41 are used to define the geometric plane 55. When the positioning lens and balls 34 and 40–41 are precisely placed on the mounting member 31, the geometric plane 55 is precisely defined. The planar optical device 32 can then be placed on the mounting member 31 against each of the positioning lens and balls 34 and 40–41 such that the planar optical device 32 is always in the defined geometric plane 55. This allows the planar optical device 32 to be precisely mounted and aligned on the mounting member 31.

As can be seen from FIGS. 3 and 4, the positioning lens and balls 34 and 40–41 are of different sizes in order to define the geometric plane 55. As is known, a geometric plane is defined by three points that are not in a straight line. If the positioning lens and balls 34 and 40–41 all have the same size, then only a straight line (not a geometric plane) is defined.

In an alternative embodiment, the spherical lens 34 may not be used both as a spherical positioning ball and an optical lens. In this case, the spherical lens 34 is positioned away from the planar optical device 32 to serve only as an optical lens. An additional spherical positioning ball is now used in place of the spherical lens 34 to help define the geometric plane 55 with the spherical positioning balls 40–41.

In one embodiment, the defined geometric plane 55 is substantially perpendicular to the top surface of the mounting member 31. In an alternative embodiment, the defined geometric plane may be a tilted geometric plane from the perpendicular position.

To precisely mount each of the positioning lens and balls 34 and 40–41 on the mounting member 31, pyramidal cavities 50 through 52 are formed in the mounting member 31 to seat the positioning lens and balls 34 and 40–41. Each of the pyramidal cavities 50–52 is a precision-formed cavity that precisely defines the location of each of the lens and balls 34 and 40–41 on the mounting member 31. In one embodiment, each of the pyramidal cavities 50–52 has a square opening.

In one embodiment, when the mounting member 31 is made of <100> silicon, the pyramidal cavities 50–52 are defined by photo-lithographic masking and etching on the mounting member 31. The pyramidal cavities 50–52 are then formed by anisotropic etching using a KOH (i.e., potassium hydroxide) etchant. The speed of the anisotropic etching can be 1000 to 1 under some conditions. This means that the vertical etching rate into the silicon mounting member 31 is 1000 times faster than the speed of etching towards the <111> crystallographic planes of the silicon mounting member 31. In other words, the <111> crystallographic planes serve as etch stops. The anisotropic etching causes the etched side walls of each of the pyramidal cavities 50–52 to lie on the <111> crystallographic planes of the mounting member 31. This thus precisely defines and forms the pyramidal cavities 50–52. Using photo-lithographic masking and anisotropic etching allows the cavities 50–52 to be formed with tolerances of approximately 1 micron. Alternatively, the pyramidal cavities 50–52 can be formed using other known methods.

When each of the positioning lens and balls 34 and 40–41 is seated in the respective one of pyramidal cavities 50 through 52, the planar optical device 32 can then be placed against each of the lens and balls 34 and 40–41. This causes the planar optical device 32 to be placed in the defined geometric plane 55. At this time, no active alignment is required to align the planar optical device 32. The planar optical device 32 can now be bonded to the mounting member 31 by, for example, an adhesive. Alternatively, the planar optical device 32 can be bonded or attached to the mounting member 31 by other known means or methods.

Figure 5:
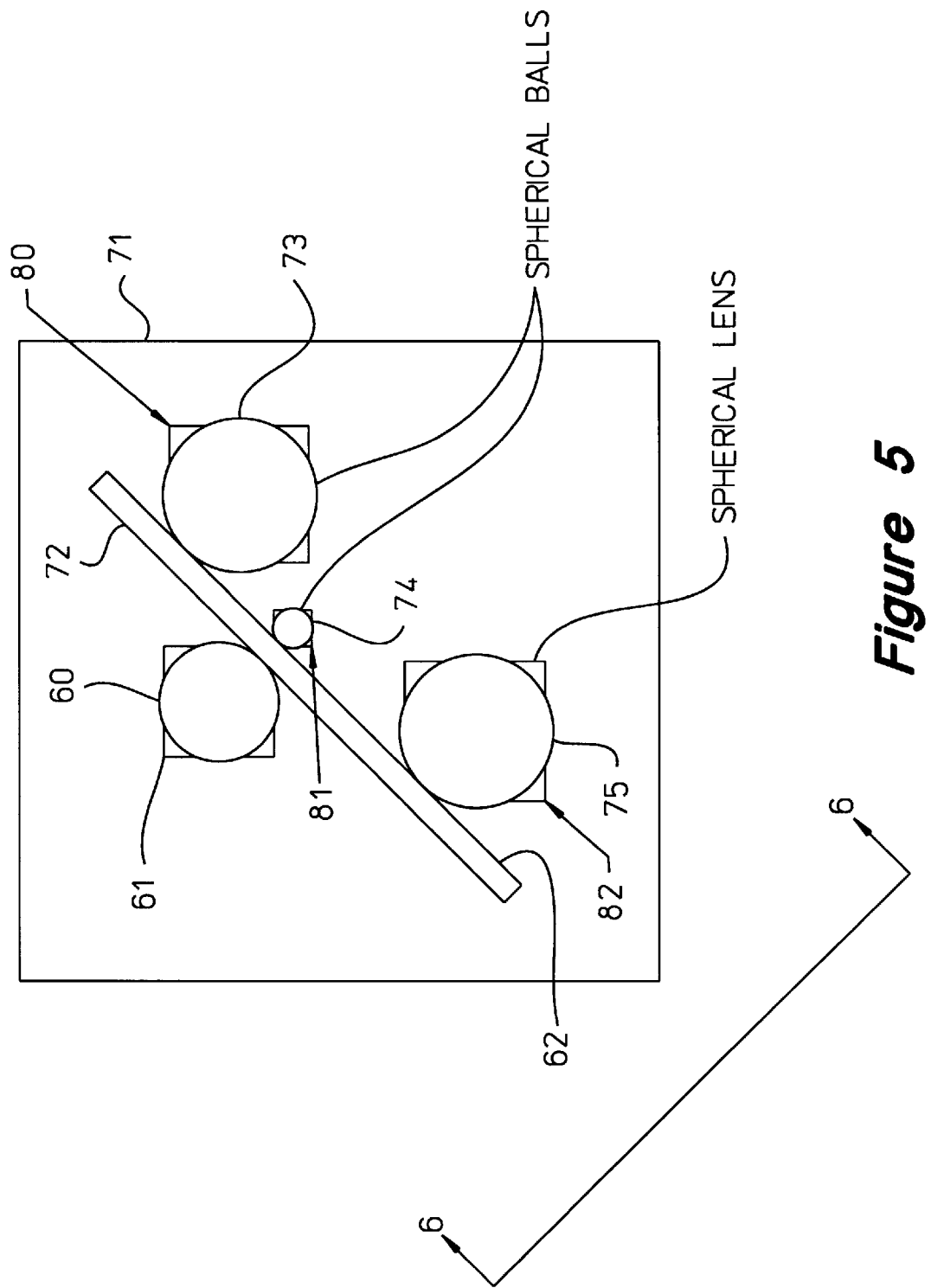
FIGS. 5 through 8 show various modifications of the arrangement of FIGS. 3–4.
Figure 6:
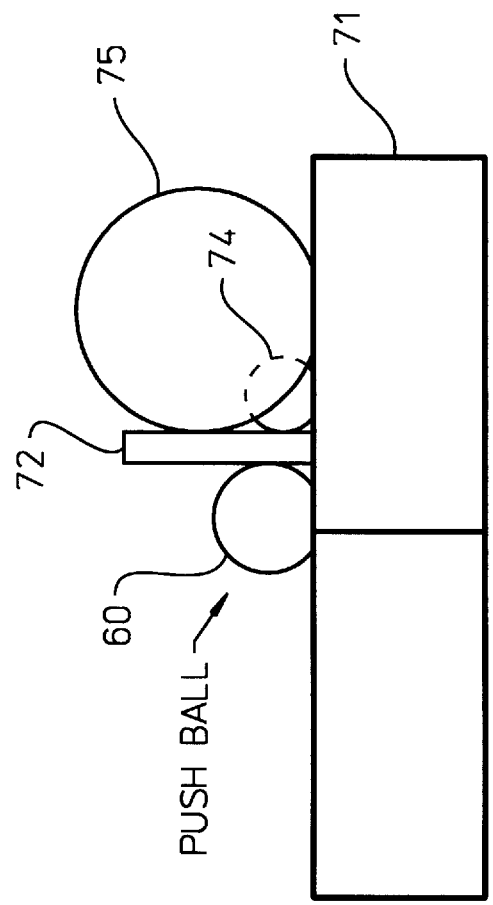

FIGS. 5 and 6 show an alternative embodiment of the arrangement of FIGS. 3–4. FIG. 5 is a top view and FIG. 6 is a side view along line 6—6 of FIG. 5. As can be seen from FIGS. 3–6, the arrangement shown in FIGS. 5–6 is identical to that shown in FIGS. 3–4, except that the arrangement of FIGS. 5–6 further uses a spherical push ball 60 seated in a precision-formed pyramidal cavity 61. As shown in FIGS. 5–6, the push ball 60 helps push the planar optical device 72 against each of the positioning lens and balls 73–75 such that the planar optical device 72 is positioned along the geometric plane 62 defined by the spherical positioning lens and balls 73–75. The push ball 60 also helps secure the planar optical device 72 on the mounting member 71. The push ball 60 is seated in the pyramidal cavity 61. The pyramidal cavity 61 can be formed in the same manner as the pyramidal cavities 80 through 82 for the positioning lens and balls 73–75.

Figure 7:
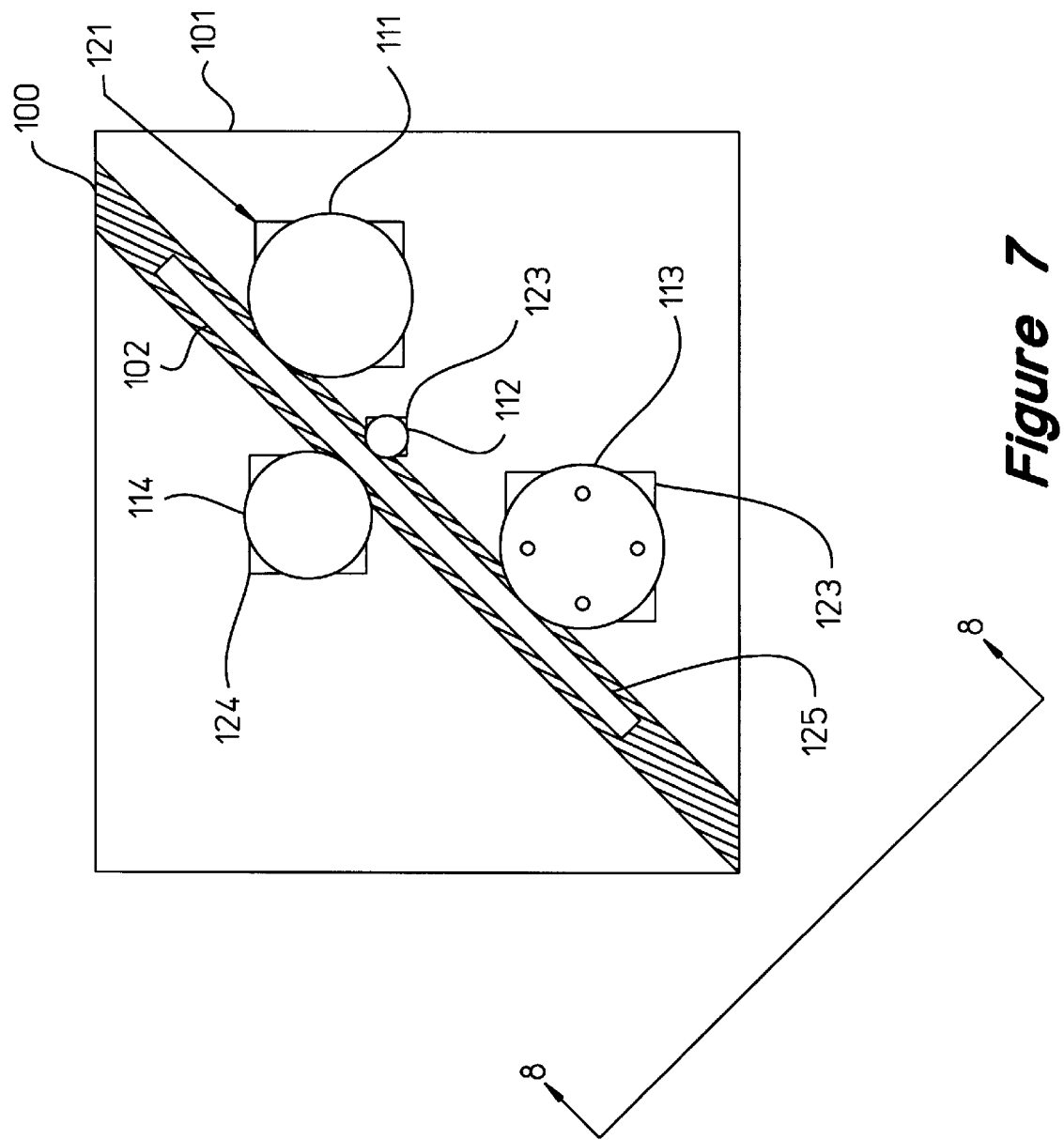
Figure 8:
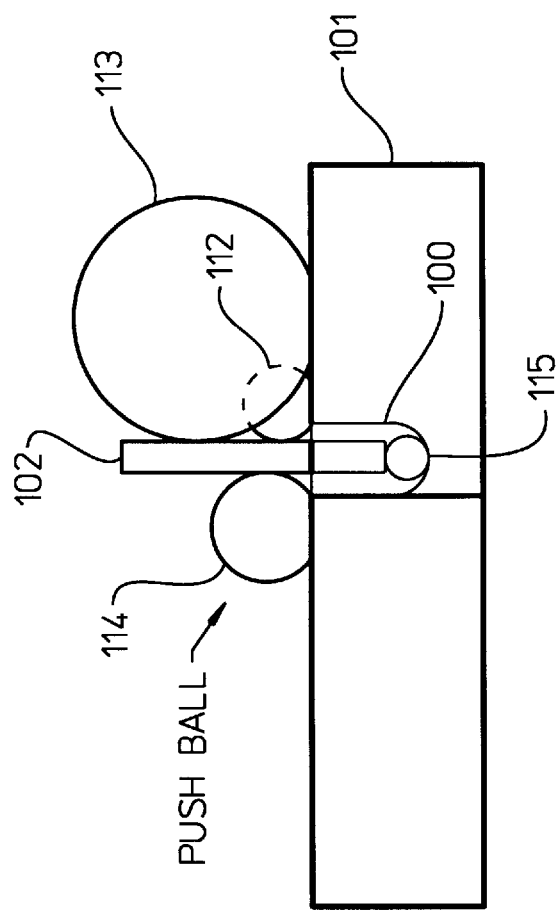

FIGS. 7 and 8 show an alternative embodiment of the arrangement of FIGS. 5–6. FIG. 7 is a top view and FIG. 8 is a side view along line 8—8 of FIG. 7. As can be seen from FIGS. 5–8, the arrangement shown in FIGS. 7–8 is identical to that shown in FIGS. 5–6, except that the arrangement of FIGS. 7–8 further includes a groove 100 in the mounting member 101. The groove 100 receives part of the planar optical device 102 because for some applications, it may be necessary to have the bottom of the planar optical device 102 below the top surface of the mounting member 101.

As can be seen from FIG. 8, the bottom 115 of the groove 100 is semi-cylindrical. In one embodiment, a cylindrical glass fiber 118 may be placed in the groove 100 in contact with the bottom 115 to help locate the planar optical device 102 in the groove 100, as shown in FIG. 8. Alternatively, the glass fiber 118 may not be placed in the groove 100. The planar optical device 102 is then bonded by, for example, epoxy or other adhesive in the groove 100.

In addition, the lens and balls 111–114 may not be used to define and position the planar optical device 102. In this case, the planar optical device 102 may simply be placed against a vertical side wall of the groove 100.

In one embodiment, the groove 100 is formed using a dicing saw. Alternatively, the groove 100 can be formed by other means.

Figure 9:
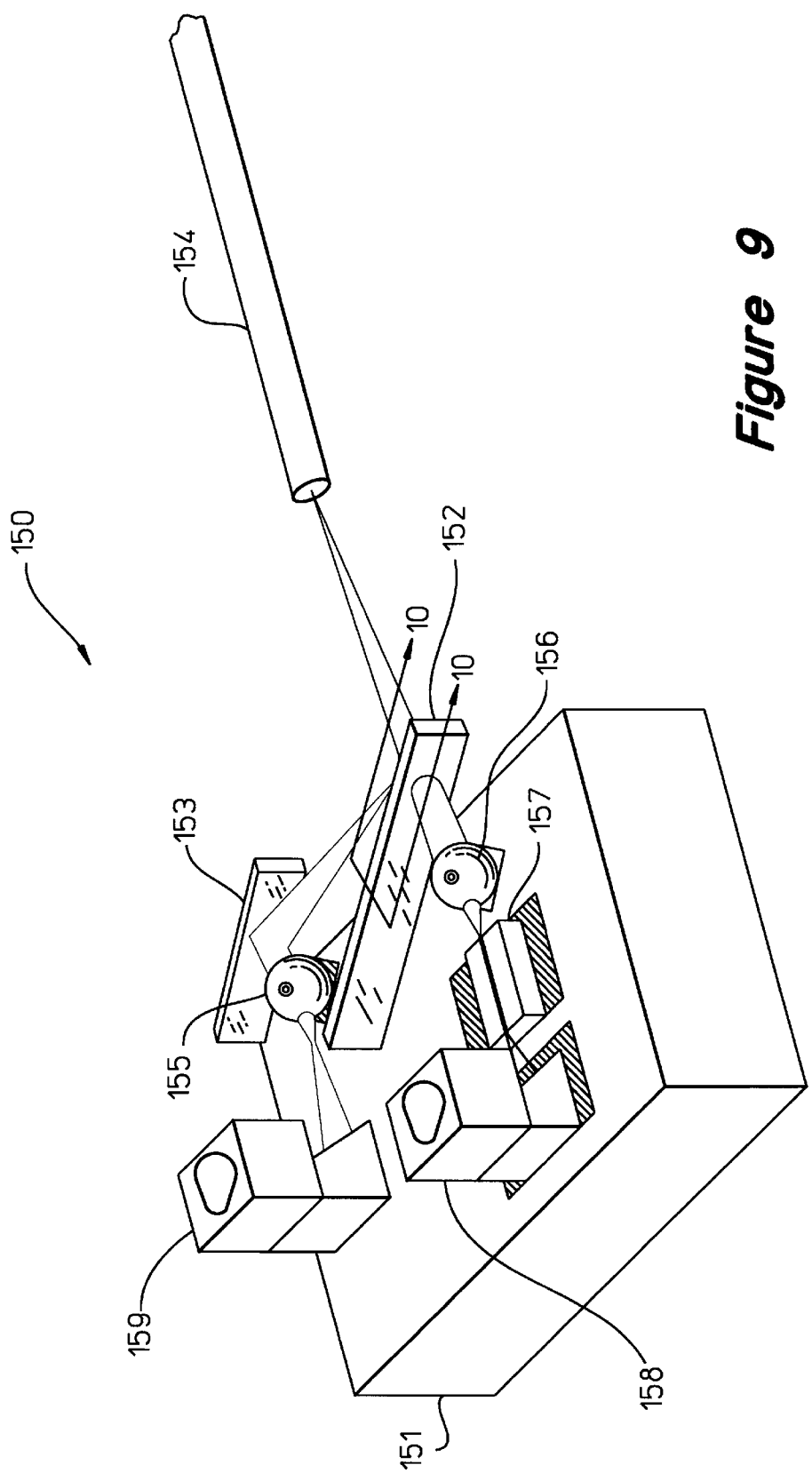
FIG. 9 is a perspective view of another bidirectional photonics module that has two planar optical devices mounted precisely on a mounting member in accordance with another embodiment of the present invention.

FIG. 9 is a perspective view showing another arrangement of erecting and mounting planar optical devices (i.e., a planar optical filter 152 and a planar mirror 153) of a photonics module 150 on a mounting member 151 in accordance with another embodiment of the present invention. As can be seen from FIG. 9, each of the planar optical filter 152 and the planar mirror 153 is erected and mounted on the mounting member 151 without the help of any positioning balls. In addition, the spherical lenses 155 and 156 are not used to help position the optical filter 152 and the mirror 153. This arrangement is described in more detail below. The optical filter 152 and the mirror 153 are mounted in the same manner on the mounting member 151. Therefore, this arrangement will be described below only with reference to the optical filter 152.

Figure 10:
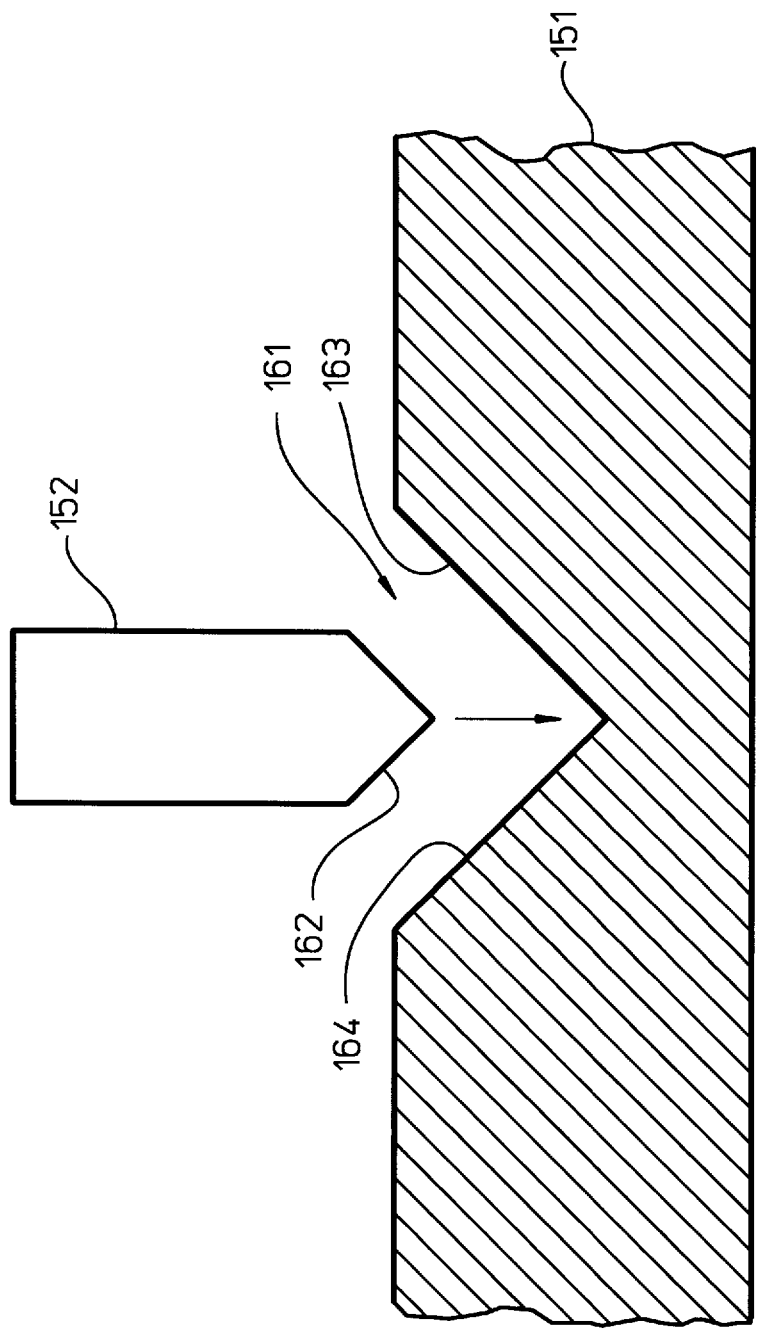
FIG. 10 is a cross-sectional view of the photonics module along ling 10—10 of FIG. 9.

FIG. 10 shows the arrangement of FIG. 9 in more detail. FIG. 10 is a cross-sectional view of the mounting member 151 and the optical filter 152 along line 10—10 of FIG. 9. FIG. 10 shows the mounting member 151 and the optical filter 152 in a coupling position to better illustrate the arrangement of the present invention.

As shown in FIG. 10, a groove 161 is provided in the mounting member 151 to seat the planar optical filter 152. The groove 161 is, for example, a V-shaped groove and the planar optical filter 152 has a V-shaped end 162 that matches the V-shaped groove 161. Glue or other adhesives can be used to bond the optical filter 152 after the optical filter 152 is seated in the groove 161.

The groove 161 is a precision-formed groove in the mounting member 151. This also means that the location of the groove 161 on the mounting member 151 is precisely defined. When the optical filter 152 is mounted in the groove 161, the optical filter 152 is also precisely mounted and aligned on the mounting member 151.

In one embodiment, the mounting member 151 is made of <100> silicon. This allows the V-shaped groove 161 to be defined on the mounting member 151 using photo-lithographic masking and etching. The groove 161 is then formed using anisotropic etching such that side walls (e.g., the side walls 163 and 164) of the groove 161 lie on the <111> crystallographic planes of the silicon mounting member 151. This causes the side walls 163–164 to intersect the top surface of the mounting member 151 at approximately 54° because the <111> planes intersect the <100> surfaces of the mounting member 151 at approximately 54°. The V-shaped end 162 of the optical filter 152 can be formed by two saw cuts using, for example, dicing saw. Alternatively, the V-shaped end 162 can be formed by other known means.

If the optical filter 152 is to be vertically mounted on the mounting member 151, then the V-shaped end 162 is formed by two 54° symmetrical cuts. If the optical filter 152 is to be tilted on the mounting member 151, then the V-shaped end 162 is formed by two asymmetrical cuts at two different angles.

Figure 11:
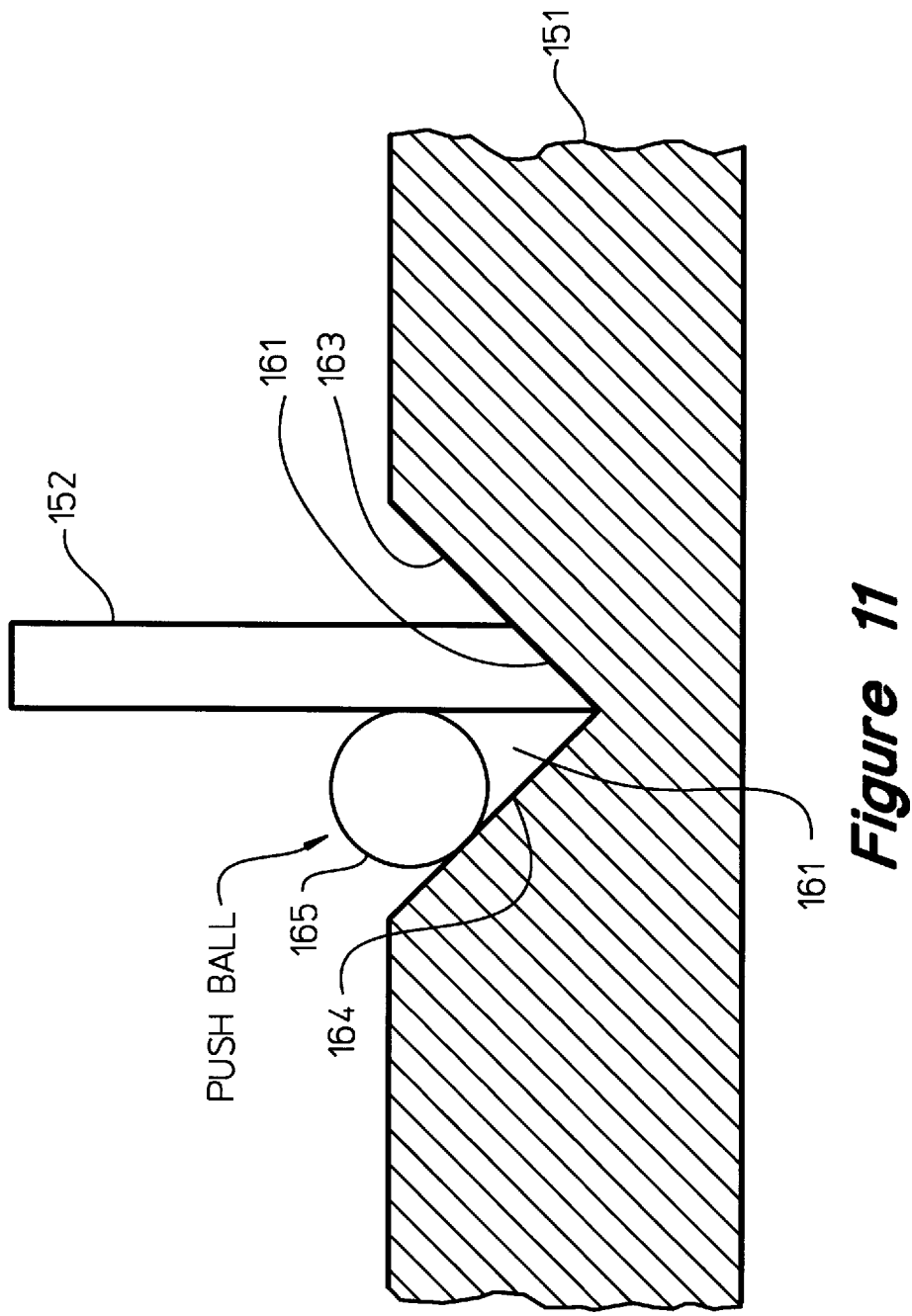
FIGS. 11 through 16 show various modifications of the arrangement of FIGS. 9–10.

In an alternative embodiment as shown in FIG. 11, the optical filter 152 may have one saw cut to form a sloping end 166 such that the surface of the sloping end 166 contacts one side wall (i.e., the side wall 163) of the V-shaped groove 161. Again, if the optical filter 152 is to be vertically mounted on the mounting member 151, the sloping end 166 is formed by a 54° saw cut. If the optical filter 152 is to be tilted on the mounting member 151, the saw cut may be made at an angle other than 54°.

A spherical push ball 165 is then placed in the V-shaped groove 161 to help hold the optical filter 152 in place in the groove 161. Alternatively, more than one push ball can be used to help secure the optical filter 152 in the groove 161. The push ball 165 in the groove 161 contacts the side wall 164 and one surface of the optical filter 152 such that the optical filter 152 is held in place in the groove 161. The optical filter 152 can now be bonded to the mounting member 151 in the groove 161.

Figure 12:
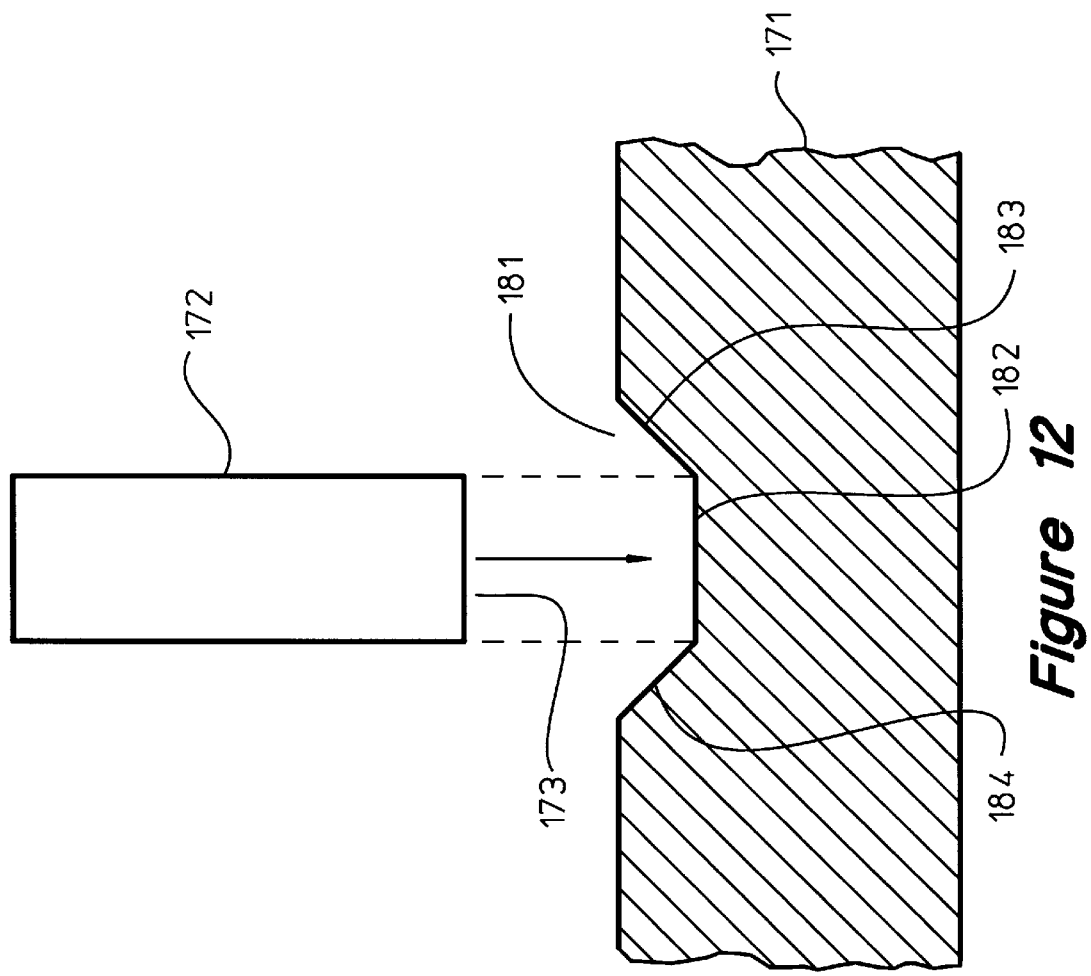

FIG. 12 shows an alternative embodiment of the arrangement of FIGS. 9–10. As can be seen from FIG. 12, the groove 181 in the mounting member 171 is not a V-shaped groove. Instead, the groove 181 is a truncated V-shaped groove with a flat bottom surface 182 and two sloping side walls 183 and 184. The bottom 173 of the optical filter 172 contacts the flat bottom surface 182 of the groove 181 when the optical filter 172 is received in the groove 181. Glue or other adhesives are then applied into the groove 181 along the gaps between the optical filter 172 and the side walls 183–184 to bond the optical filter 172 in the groove 181. Because of its small size, the optical filter 172 remains in place in the groove 181 while glue or other adhesives are used to bond the optical filter 172.

Figure 13:
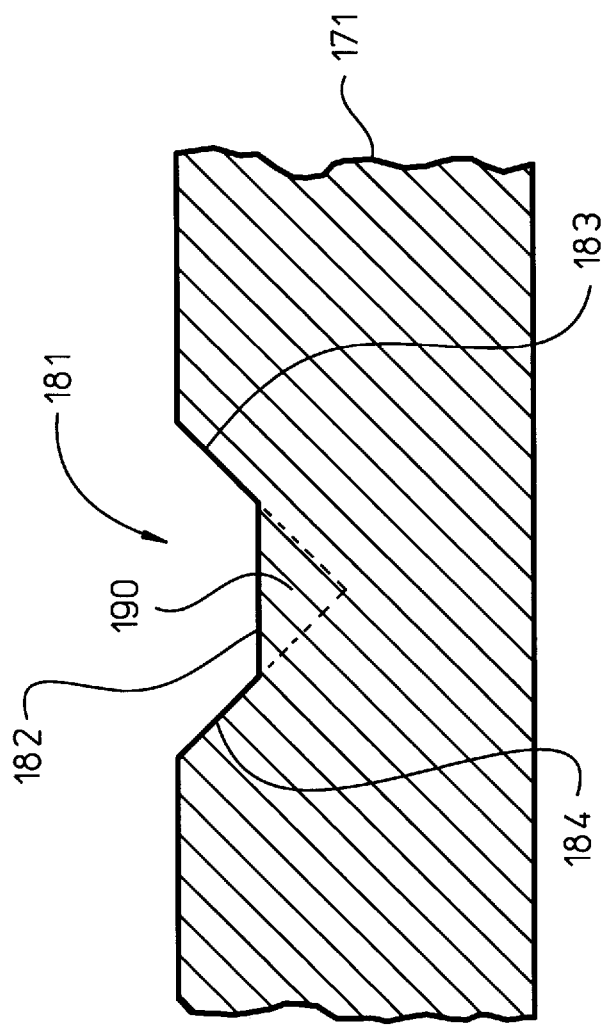

The groove 181 of FIG. 12 can be formed substantially in the same manner as the groove 161 of FIG. 10. This means that the groove 181 is also formed using anisotropic etching. Depending on the etching condition, either the truncated V-shaped groove 181 of FIG. 12 or the V-shaped groove 161 of FIG. 10 is formed. FIG. 13 shows the etching process. As can be seen from FIG. 13, the groove 181 is formed when an incomplete anisotropic etching is performed. When a complete anisotropic etching is performed, a V-shaped groove 190 is formed. As can be seen from FIGS. 10 and 13, the V-shaped groove 161 of FIG. 10 has identical shape as that of the V-shaped groove 190.

Figure 14:
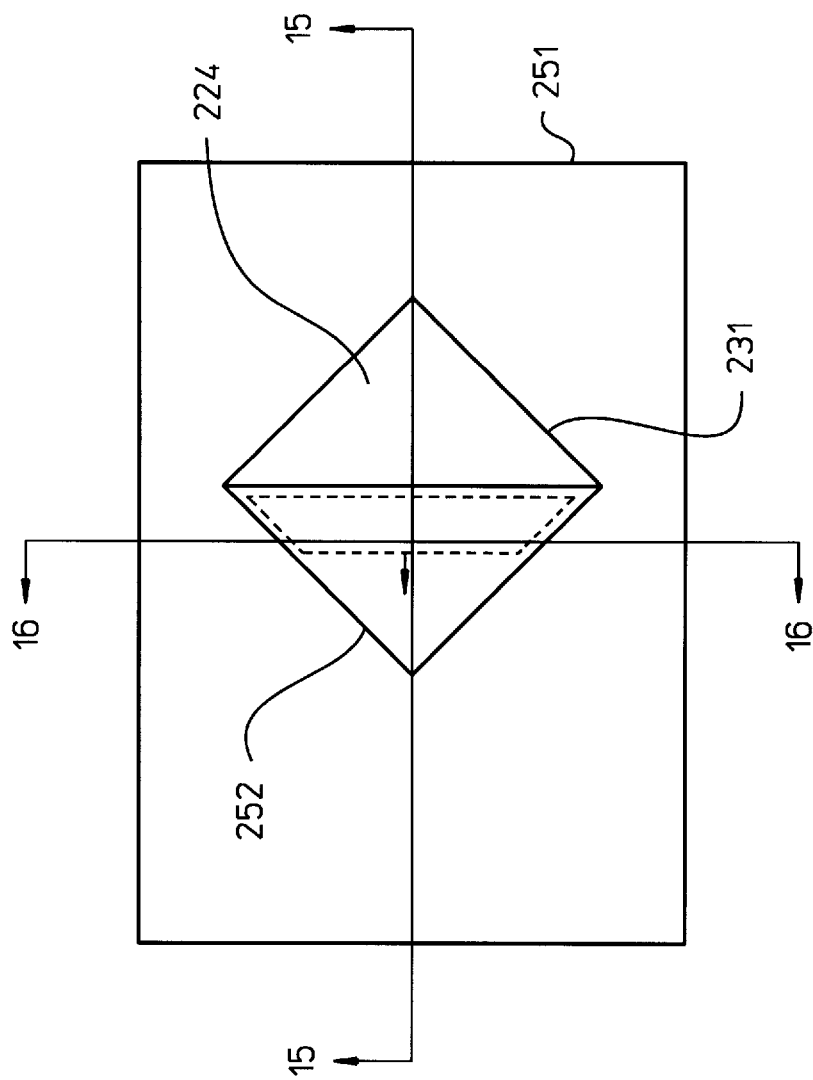
Figure 15:
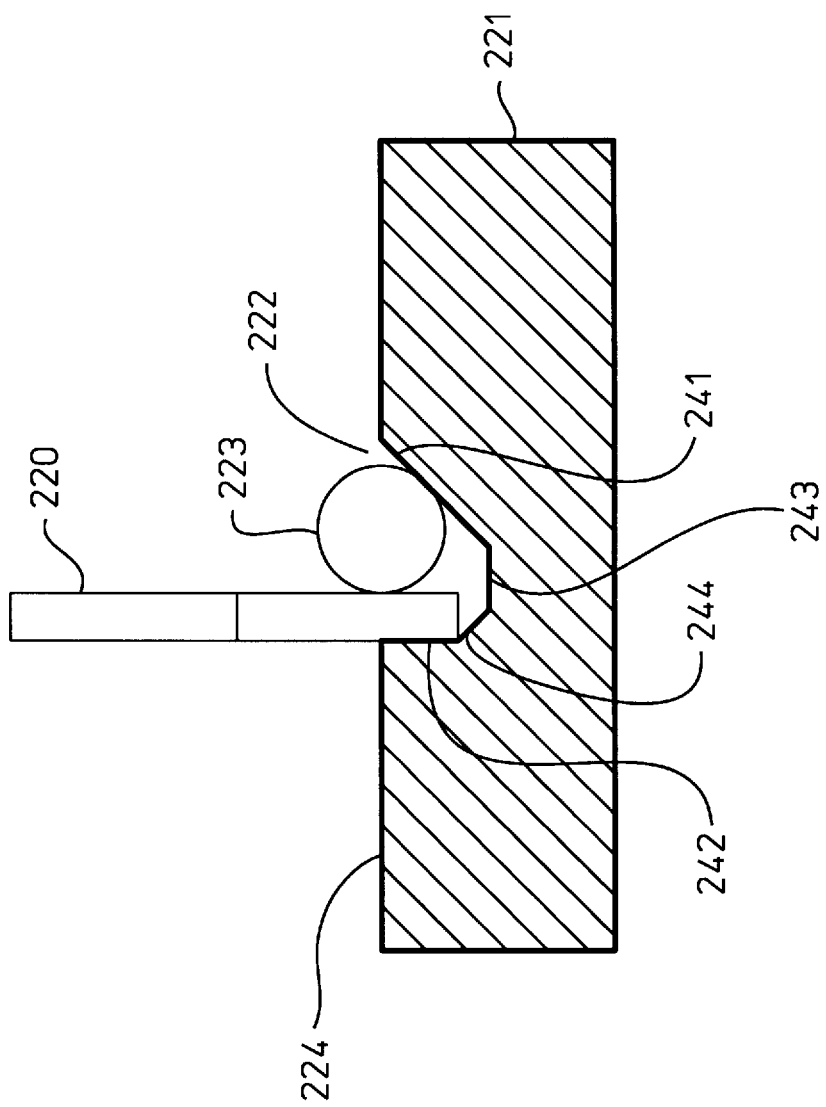
Figure 16:
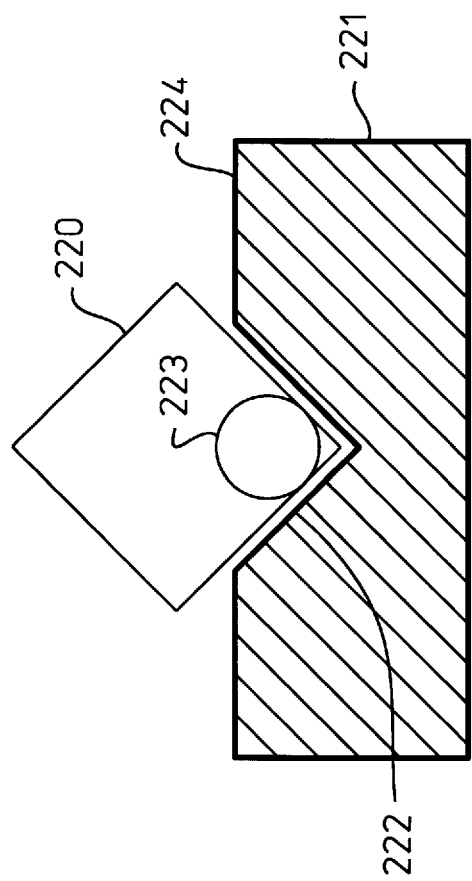

FIGS. 14 through 16 show another alternative embodiment of mounting a planar optical device 220 on a mounting member 221 in accordance with a further embodiment of the present invention. The mounting member 221 is made of <100> silicon. FIG. 14 is a top view of the mounting member 221. FIG. 15 is a cross-sectional side view along line 15—15 of FIG. 14 with the planar optical device 220 mounted. FIG. 16 is another cross-sectional side view along line 16—16 of FIG. 14 also with the planar optical device 220 mounted.

As can be seen from FIG. 15, a cavity 222 is formed in the mounting member 221 to seat the planar optical device 220. The cavity 222 is a substantially pyramidal cavity with a truncated bottom and corner. This means that the cavity 222 has a vertical side wall 242 and a flat bottom surface 243. The planar optical device 220 is placed in the cavity 222 against the vertical side wall 242. A spherical push ball 223 is also placed in the cavity 222 to hold the planar optical device 220 in place in the cavity 222. The planar optical device 220 can now be bonded by glue or other adhesives that are applied in the cavity 222.

As can be seen from FIGS. 14–16, the cavity 222 is formed by first defining and etching a triangular opening 231 on a mask layer 251 that is applied on the top surface 224 of the mounting member 221, exposing the top surface 224 of the mounting member 221 at the triangular opening 231. The triangular opening 231 is photo-lithographically formed such that the opening 231 has a tolerance of about one micron. The triangular opening 231 is formed on the mask layer 251 along a crystallographic axis of the silicon mounting member 221. The two edges of the triangular opening 231 lie on two <111> crystallographic planes of the silicon mounting member 221. The mounting member 221 is then anisotropically etched through the opening 231 using, for example, the KOH etchant. The speed of the anisotropic etching can be, for example, 1000 to 1 to result in the vertical side wall 242 (FIG. 15) extending horizontally beneath the mask layer 251, parallel to the hypotenuse of the triangular opening 231. The etching rate of pushing the vertical wall 242 is approximately the same as the vertical etching rate. The etching is eventually self stopped in the cavity 222 when the vertical side wall 242 disappears. At this time, the pyramidal cavity 222 has a square opening 252 with all of its four side walls defined by the <111> crystallographic planes. When the anisotropic etching is stopped at an earlier stage of the etching process, the pyramidal cavity 222 is formed to have a truncated corner formed by the vertical side wall 242 (shown in FIG. 15).

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. A method of precisely and controllably mounting a planar optical component on a mounting member, comprising the steps of:
   (A) placing a plurality of balls on the mounting member to precisely define a geometric plane;
   (B) placing the planar optical component against the balls placed on the mounting member such that the planar optical component is located in the defined geometric plane on the mounting member.

2. The method of claim 1, further comprising the step of forming a plurality of cavities in the mounting member to seat the balls prior to the step (A).

3. The method of claim 1, wherein the planar optical component is one of an optical filter and a mirror.

4. The method of claim 1, further comprising the step of forming a groove in the mounting member to receive part of the planar optical component prior to the step (B).

5. The method of claim 4, wherein the groove is formed using a dicing saw.

6. The method of claim 5, further comprising the step of shaping an end of the planar optical component to match that of at least one wall of the groove.

7. The method of claim 6, further comprising the step of placing a push ball in the groove against the planar optical component to help secure the planar optical component.

8. The method of claim 4, further comprising the step of applying an adhesive to the groove to bond the planar optical component.

9. The method of claim 1, further comprising the step of placing a push ball on the mounting member to push the planar optical component against the plurality of balls such that planar optical component is secured by the plurality of balls and the push ball.

10. The method of claim 1, wherein the plurality of balls are spherical balls and are of different sizes in order to define the geometric plane.

11. A method of precisely and controllably mounting a planar optical component on a mounting member, comprising the steps of:
- (A) forming a cavity in the mounting member;
- (B) placing the planar optical component against a first side wall of the cavity;
- (C) placing a ball in the cavity such that the spherical ball is against the planar optical component and a second side wall of the cavity to help secure the planar optical component.

12. The method of claim 11, wherein the cavity is substantially pyramidal with the first side wall being substantially vertical and the ball is spherical.

13. The method of claim 11, further comprising the step of applying an adhesive material into the cavity to bond the planar optical component in the cavity.

14. The method of claim 11, wherein the planar optical component is one of an optical filter and a mirror.

* * * * *